United States Patent [19]
Brown

[11] 4,391,352
[45] Jul. 5, 1983

[54] BRAKE SYSTEM AND APPARATUS AND METHOD THEREFOR

[76] Inventor: Lawrence G. Brown, 1629 Kuhilani St., Honolulu, Hi. 96816

[21] Appl. No.: 765,062

[22] Filed: Feb. 2, 1977

[51] Int. Cl.³ .............................................. B62L 1/14
[52] U.S. Cl. .............................. 188/24.12; 188/24.22
[58] Field of Search ............... 188/251 M, 24, 264 B, 188/24.11, 24.12, 24.22

[56] References Cited

U.S. PATENT DOCUMENTS

| | | | |
|---|---|---|---|
| 735,113 | 8/1903 | Kelland et al. | 188/24 |
| 2,460,204 | 1/1949 | Vacher | 188/24 |
| 2,464,437 | 3/1949 | Dasher | 188/251 M X |
| 2,976,957 | 3/1961 | Brooks | 188/264 B X |
| 3,628,635 | 12/1971 | Yoshigai | 188/24 |
| 3,891,398 | 6/1975 | Odier | 188/251 M |
| 3,951,240 | 4/1976 | Dowell et al. | 188/251 M X |

*Primary Examiner*—Duane A. Reger
*Attorney, Agent, or Firm*—Bruce G. Klaas

[57] ABSTRACT

A brake system and method of braking including brake pads made of an "anti-friction" material, which may be lubricated, to establish a constant wet coefficient of friction in use with braking force applying apparatus for applying relatively high braking force which may be obtained in part by the energy of the moving member to which the braking force is applied.

23 Claims, 10 Drawing Figures

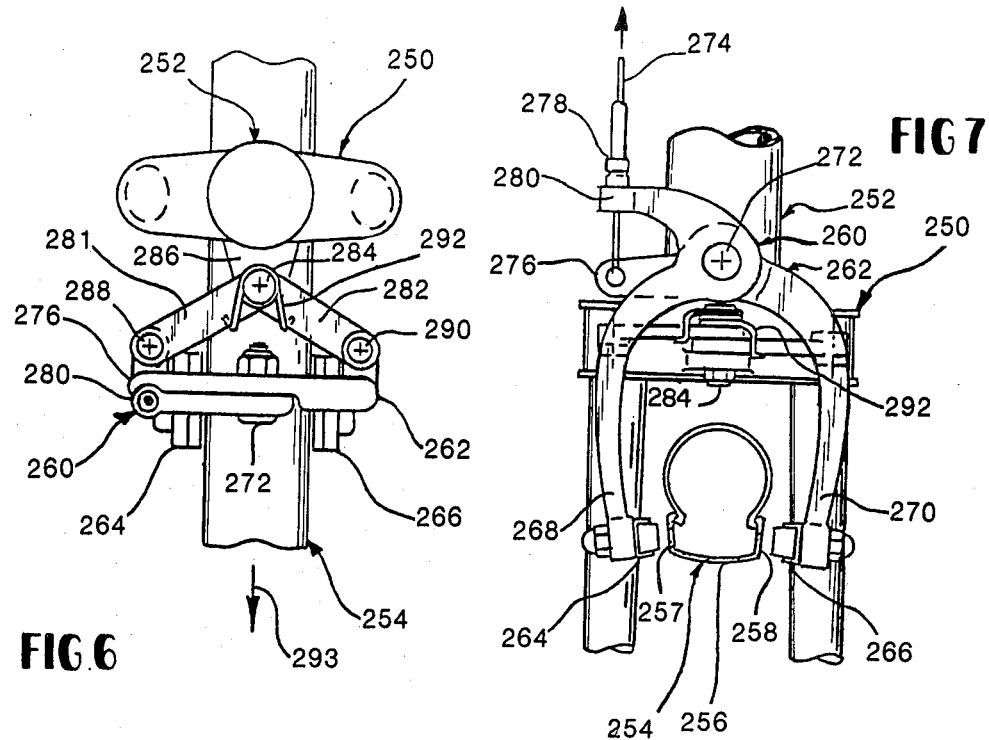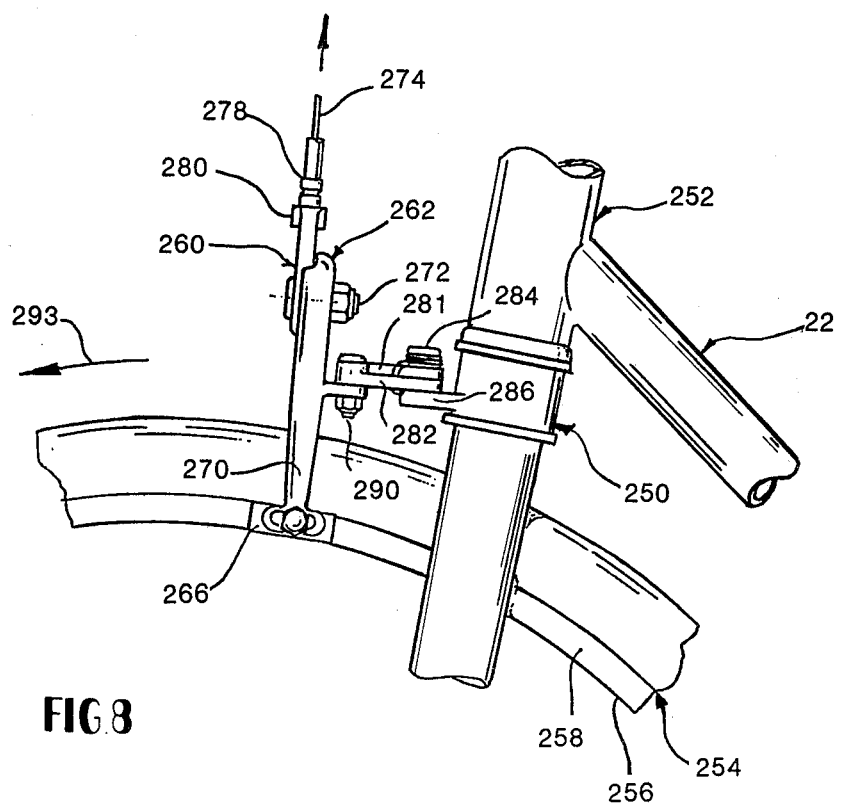

BRAKE SYSTEM AND APPARATUS AND METHOD THEREFOR

BACKGROUND AND SUMMARY OF THE INVENTION

This invention relates to brake systems and brake system components and, more particularly, to vehicular brake systems such as for bicycles or the like.

In general, the invention involves the use of a braking material providing a braking surface having the characteristic of maintaining a substantially uniform braking force regardless of the presence of liquids, such as water, or lubricants, such as oil or grease or the like, on the braking surface or between braking surfaces.

The coefficient of friction characteristics of conventional brake materials are well known and it is a well known fact that conventional brake materials have substantially different coefficients of friction under dry and wet operating conditions. For example, conventional rubber compound braking materials, such as commonly used for bicycle brakes, have a dry coefficient of friction (cf) of approximately between 0.5 and 0.9 and a wet cf of approximately between 0.1 and 0.03. All references herein to coefficients of friction are based upon standard measurements of the material against steel. Thus, under wet operating conditions, conventional bicycle brakes have very little braking capability and the available braking force may vary widely resulting in substantial danger to a bike rider. Indeed, bicycle accident statistics show that bicycle brake problems are a leading cause of bicycle accidents. Of course, loss of braking capability is a problem in any braking system for any use and wet braking problems have been long known in vehicular braking systems for airplanes, automobiles and trucks.

It has been conventional practice in the brake art to utilize materials for brake pads which have relatively high dry cf and may be generally categorized as "friction materials" as opposed to bearing type materials known in the bearing art as "anti-friction materials". While it has been conventional practice in the brake art to attempt to solve braking problems and to provide better braking systems by utilization of "friction materials" having relatively high coefficients of friction, in general, the present invention involves the use of "anti-friction materials" which have relatively low coefficients of friction. In addition, while it has been conventional practice to attempt to solve set braking problems by elimination of the cause of wet conditions and/or by temporarily effecting changes in a braking system designed for normal operation under dry conditions, a presently preferred embodiment of the invention involves a brake system utilizing an "anti-friction" brake pad material which normally operates in a "wet" relatively low cf condition so as not to be affected by changes in coefficient of friction due to variations in wet and dry operating conditions.

An important object and result of the present invention is the provision of a brake system utilizing an "anti-friction" brake material having substantially the same coefficient of friction in all conditions of operation so that there is no substantial difference in operation of the system in wet or dry conditions.

In the presently preferred form of the invention, the material used is Oilite which is generally known and widely used as a low friction bearing material. Oilite material may be characterized as a relatively hard, non-compressible by applied braking forces, porous (i.e., permeable by liquids), sintered metal powder material, such as bronze, which may be impregnated or coated with a lubricating material such as oil or grease. Such a material has a coefficient of friction of 0.34 when dry and without lubricant and a coefficient of friction of 0.17 when lubricated or wet.

I have discovered that the use of such a material for a brake substantially eliminates the problem of brake "fade" in wet operating conditions. Brake "fade" reduction in coefficient of friction results not only from wet conditions but also from increases in temperature in use. The use of low friction metallic bearing materials has the additional advantage of providing higher more rapid heat transfer than conventional friction type brake materials so as to reduce brake "fade" problems resulting from excessive heat. In addition, such low friction metallic bearing materials have relatively high plastic flow points, e.g., approximately 600° F. to 850° F., as compared with conventional high friction brake materials such as rubber compounds which have substantially lower (e.g., approximately 200° F. to 300° F.) plastic flow points whereat the surface characteristics are subject to being permanently altered. Thus, the low friction metallic bearing materials are substantially less subject to heat related deterioration that other high friction brake materials.

In order to achieve required levels of braking force by use of an "anti-friction material" providing a relatively low coefficient of friction, the present invention further comprises new and improved apparatus and methods for applying relatively high braking forces sufficient to achieve desired braking results without danger of brake locking. Such apparatus and methods may also provide for self powering and/or self energizing of the brake by utilizing the energy of the member whose motion is to be changed to increase the applied braking force.

BRIEF DESCRIPTION OF THE DRAWINGS

FIG. 3 is a front elevational view of one form of force applying mechanism for a bicycle brake system or the like;

FIG. 4 is a front elevational view of another form of force applying mechanism for a bicycle brake system or the like;

FIG. 5 is a perspective view of another form of force applying mechanism for a bicycle brake system or the like;

FIG. 6 is a top view of another form of force applying mechanism for a bicycle brake system;

FIG. 7 is a front elevational view of the mechanism of FIG. 6;

FIG. 8 is a side elevational view of the mechanism of FIGS. 6 and 7;

FIG. 9 is a perspective view of another form of force applying mechanism for a bicycle brake system or the like.

DETAILED DESCRIPTION

In General

While the inventive concepts are disclosed hereinafter in connection with presently preferred and illustrative embodiments thereof adapted for use primarily with a bicycle, it is contemplated that the broadest inventive concepts may be utilized in brake systems for retarding the movement of any moving member and for other types of vehicles including self-propelled and motor driven types of vehicles.

Figure 1:
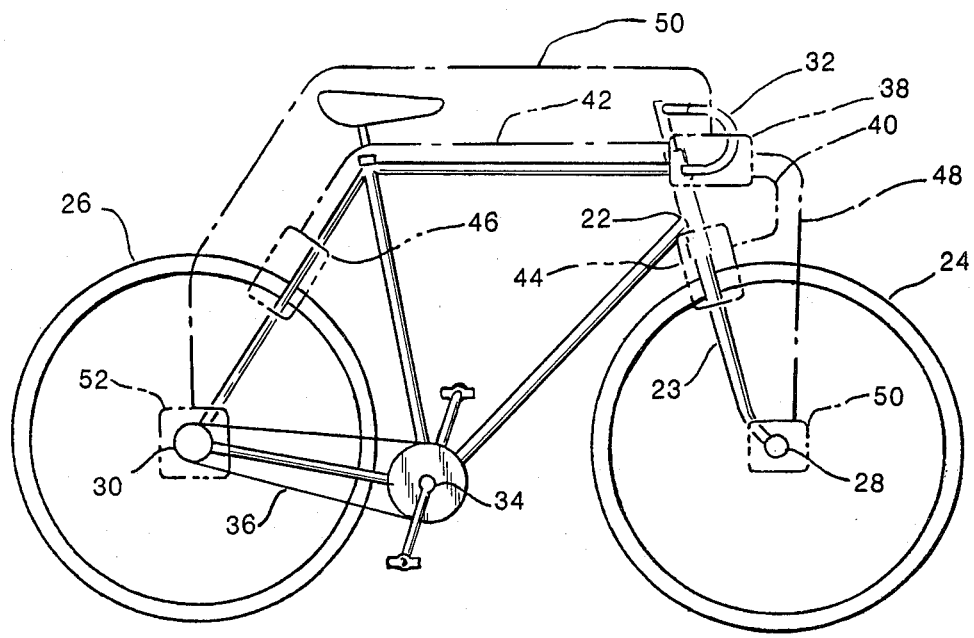
FIG. 1 is a schematic side elevational view of a bicycle with bicycle brake system components schematically illustrated thereon by broken lines.

In FIG. 1, a bicycle or the like 20 is shown to comprise frame means 22 including front wheel fork means 23; front and rear wheel means assemblies 24, 26 rotatably mounted on axle means 28, 30 attached to the frame means; handle bar means 32; pedal and crank means 34, and drive means 36 operatively connecting the pedal and crank means to the rear wheel means 26. Conventional types of bicycle brake systems include coaster brakes (not shown) operable by braking force applied to the rear wheel through the pedal and crank means 34 and drive means 36; and hand operated caliper and/or disc brakes which are operable by hand operable control lever means 38 mounted on the handle bar means 32 or frame means 22. In a caliper brake system, the lever means 38 is operably connected to brake force applying cable means 40, 42 operably associated with caliper brake means 44, 46 attached to the frame means for operative association with the rim of the wheel assemblies. In a disc brake system, the lever means 38 is operably connected to cable means 48, 50 operably associated with disc brake means 52, 54 attached to the frame means for operative association with disc means associated with the wheel assemblies.

Figure 2:
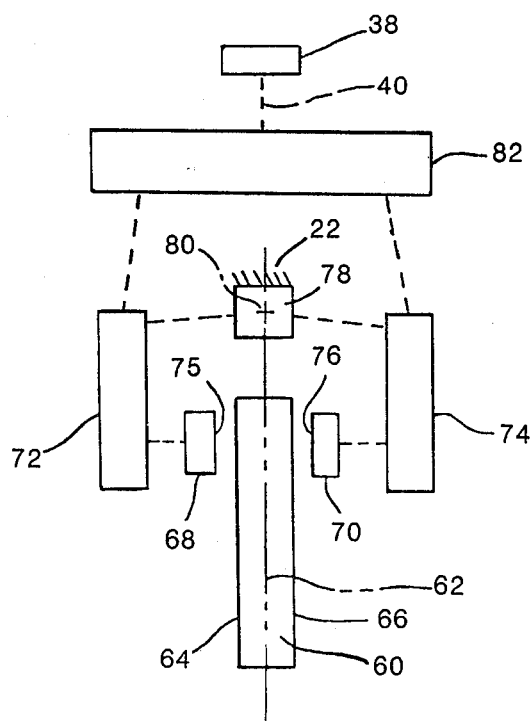
FIG. 2 is a schematic block diagram front elevational view of bicycle brake system components.

Referring now to FIG. 2, both caliper type brake means 44, 46 and disc type brake means 52, 54 may be generally characterized as comprising a movable member 60, e.g., the wheel rim or a disc attached thereto or to the wheel axles, which have a generally planar path of movement along a plane represented by broken line 62 and opposite generally parallel or inclined side surfaces 64, 66. Brake pad means 68, 70 are mounted on support arm means 72, 74 in juxtaposition to the side surfaces 64, 66 for generally transverse movement relative to surfaces 64, 66 between an outwardly displaced disengaged non-braking position in outwardly spaced relationship to the surfaces 64, 66 and an inwardly displaced engaged braking position with brake pad surfaces 75, 76 in sliding frictional surface contact with the surfaces 64, 66. The support arm means 72, 74 are mounted on the frame means 22 by mounting means 78, which usually includes a pivotal axis 80 located in outwardly spaced relationship to the moving member and in general coplanar relationship therewith, for enabling transverse movement of the support arm means while restricting movement thereof along the plane of movement of the movable member 60. The support arm means 72, 74 are operably associated with force applying and increasing means 82 connected to and operable by cable means 40 connected to the hand operated brake force applying means 38. In the present invention, the force applying and increasing means 82 by itself or in combination with the support arm means 72, 74 increases and controls the application of brake force to the moving member through the pad means.

Pad Means

To the best of my knowledge, prior art brake pads generally have been made of materials which have relatively high coefficients of friction and which have at least some degree of compressibility by applied braking forces. Such materials are generally considered to be "friction" materials such as rubber and asbestos as opposed to "anti-friction" materials such as Nylon and Teflon plastic materials or babbit and bronze metallic materials which are commonly used as bearings. In general, prior art brake materials have been thought to provide desired braking characteristics only when used in "dry" condition and not in a wet or lubricated condition as when the surfaces might be covered with water or oil or grease. On the contrary, anti-friction bearing materials are commonly used with a lubricant such as oil or grease and many anti-friction materials have inherent "self-lubricating" characteristics, such as Teflon, or may be manufactured by methods enabling the inclusion of a lubricant such as in sintered powder metallic materials.

Contrary to general prior art brake material concepts, I have discovered that "anti-friction" type bearing materials may be advantageously used as braking material and, in particular, that a sintered powder metallic material with a lubricant, such as Oilite, provides unexpected and exceptional results when employed as a braking material. A sintered powder metallic material, such as Oilite, is known to have a dry coefficient of friction of approximately 0.34 without the presence of lubrication and a wet coefficient of friction of approximately 0.17 when lubricated.

I have discovered that oilite may be used as a braking material, particularly in bicycle braking systems, and that, when so used, the braking capability of the system is not materially affected by the presence or absence of water. Thus, the usual reduction of braking capability of conventional bicycle braking systems in the presence of water may be eliminated by the use of brake pads made of such material. Actual tests with brake pads made of lubricated Oilite material have shown no significant difference in braking capability between "dry" and "wet" environmental operating conditions. In addition, some test work has indicated that, unlubricated Oilite material may also provide similar advantageous results.

Figure 10:
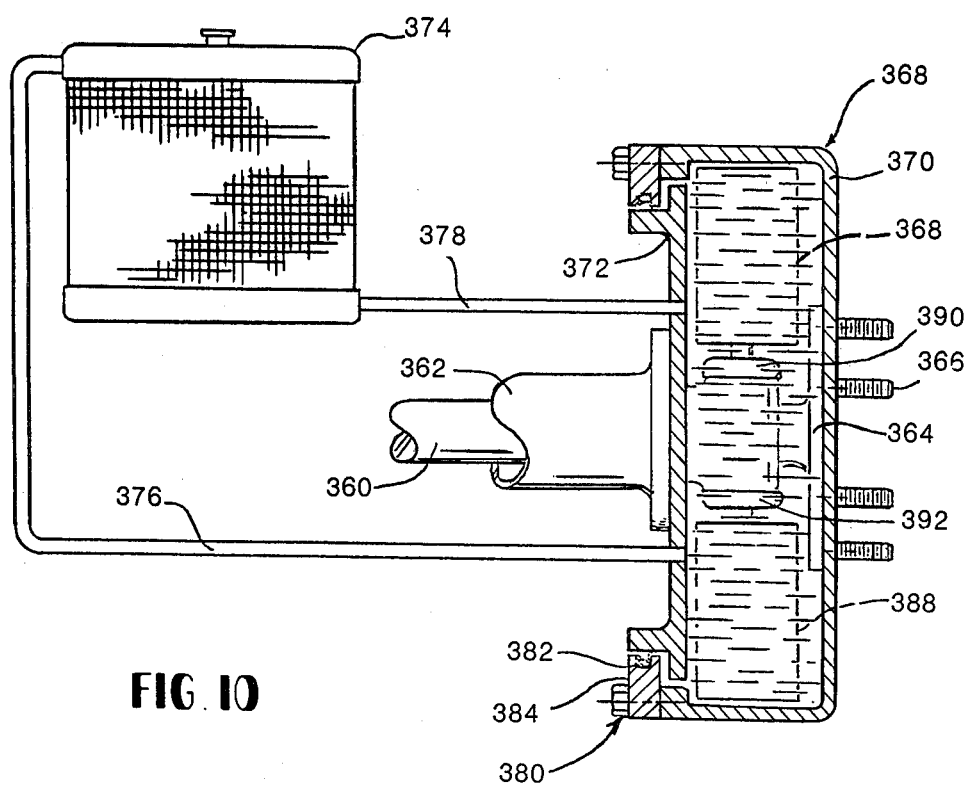
FIG. 10 is a schematic side elevational view, partially in cross-section, of a motor vehicular brake system.

While the reasons for the foregoing rather extraordinary test results are not really known or understood by me at this time, it appears to me that the results obtained may be explained in whole or in part by the known characteristics of Oilite and by the likely effects produced by the use of Oilite. First, a sintered powdered metallic material is substantially incompressible by applied braking forces, as compared with conventional rubber or rubber-like or asbestos type bicycle brake materials which are compressible by applied braking forces. Second, a sintered powder metallic material has a relatively high porosity as compared with conventional rubber or rubber-like or asbestos brake materials. Third, in the case of the presence of a lubricating or other viscous material, such as oil or grease or friction fluids, a layer or film of relatively high viscosity is provided between the brake pad friction surface and the surface of the moving member. For whatever reason, the presence of water on the moving member or on or about the brake pads does not appear to materially affect the braking capability of a braking system using brake pads of Oilite material. Perhaps the brake pad material and/or the film of viscous material prevent penetration and/or retention of water between the braking surfaces or cause such rapid displacement of any water which may penetrate therebetween that no noticeable reduction in braking capability may be observed. To the extent that the presence or absence of a lubricant or other viscous material may affect braking capability, the results of my tests indicate to me that it is desireable to deliberately provide for continuous lubrication of the brake pads. Such continuous lubrication may be achieved by using a self lubricating material such as Oilite which has a lubricating or other viscous material embedded therewithin or to provide lubricant supplying means such as a lubricant supply system for applying lubricant adjacent to the brake pad or through passages in the brake pad from an external source or reservoir of lubricant as illustrated in FIG. 10. I contemplate that the lubricant or other viscous material may be varied as necessary or desireable to achieve particular results. For example, a material of minimum viscosity, such as vater, may be utilized in certain applications or a material of relatively high and/or pressure variable viscosity such as certain commercially available power transmission fluids may provide particularly beneficial results.

In general, it is contemplated that the brake pad material be such as to provide frictional means comprising a fluid penetrable frictional surface capable of retaining a lubricant or other viscous material during use and when used has substantially the same coefficient of friction under wet and dry environmental conditions. While the useful range of wet and dry coefficients of friction of the material is variable, it appears that the material should have a dry coefficient of friction of preferably about 0.34 and no more than approximately 0.4 and a wet coefficient of friction of preferably about 0.17 and no less than approximately 0.10. In addition, it appears that the material should be relatively hard and/or relatively incompressible by applied braking forces and/or have a relatively high degree of porosity.

Additional advantages of the use of materials such as Oilite include reduction in heat, wear and noise. While I have made and tested my discovery in connection with bicycle brake systems, it is contemplated that the invention may be applicable to other types of brake systems such as vehicular braking systems, particularly truck braking systems, and machinery braking systems.

Figure 3:
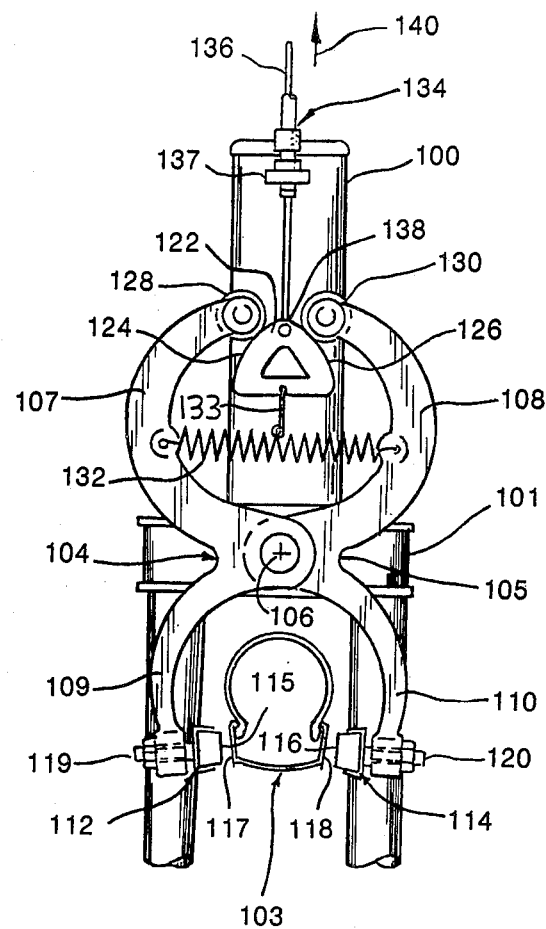

Brake Operating Means of FIG. 3

Referring now to FIG. 3, one form of brake operating means 72, 74, 82 adapted to use with brake pad materials of the type hereinbefore described is illustratively shown as mounted in association with fork housing portion 100 and the fork assembly portion 101 of the bicycle frame means 22 and the front wheel assembly 103 of a bicycle. The brake operating means comprises a pair of movable arm members 104, 105 pivotally connected and mounted on the fork assembly portion 101 by pivotal connecting means 106. Each arm member comprises outer (upper) arm portions 107, 108 and inner (lower) arm portions 109, 110. Brake pad means 112, 114, having braking surfaces 115, 116 engageable with wheel rim surfaces 117, 118 in the braking position, are adjustably mounted by conventional threaded members 119, 120 on the inner (lower) ends of arm portions 109, 110.

The arm members are movable by cam type arm operating means comprising a movable cam member 122 having oppositely spaced cam surfaces 124, 126 of identical configuration operably engageable with cam follower roller members 128, 130 mounted on arm portions 107, 108. A spring means 132, in the form of a tension spring member, is connected between and biases the arm portions toward the non-braking position and arranged to exert an opening force proportional to (which increases in accordance with) applied braking force. Spring means 132 is also connected to the cam member 122 by a wire or cable member 133 to bias the cam member toward the non-braking position and to provide a cam return force which increases in proportion to the applied braking force. The spring means 132 is arranged to assure rapid positive return of the operating components to the open free wheeling position upon release of the applied brake forces. A conventional control cable means 134, including a wire member 136 extending through threaded adjustment means 137, is connected at one end 138 to the cam member to apply braking forces thereto which are generated by a conventional brake lever manually operated by a bike rider.

In operation of the apparatus of FIG. 3, braking force is applied to the wire member 136 in the direction of the arrow 140 to cause outward (upward) movement of the cam member 122 against the bias of spring means 132. Roller members 128, 130 are pivotally equally outwardly displaced by cam surfaces 124, 126 along arcs of a circle having a center at pivot 106. The configuration of surfaces 124, 126 is such that the initial components of movement transverse to the direction of movement of the cam member are larger than the final components of transverse movement whereby each brake pad means 112, 114 is correspondingly moved larger initial equal distances toward the adjacent rim side surfaces 117, 118. In this manner, the brake pads are moved faster a longer distance during initial application of the braking force which enables the pads to be spaced outwardly of the rim side surfaces a substantial distance in the non-braking position to prevent unintended contact between the pads and the rim side surfaces which may result in prior art systems from wheel wobble and/or accidentally applied pressure on the brake operating handles. After initial contact between the pads and the rim side surfaces, the configuration of the cam surfaces is such as to provide decreasing components of transverse movement whereby the application of increased braking force is more slowly and gradually applied to the pads. As the rollers are outwardly displaced relative to the line of application of force, which is aligned with the pivot axis, the mechanical advantage is gradually increased. Thus, when the pads are engaged with the rim side surfaces, the rollers are located in a zone of maximum mechanical advantage relative to the cam surfaces. The radial distance from the pivot axis 106 to the axes of rollers 128, 130 may be greater than the radial distance from the pivotal axis to the pads to increase the mechanical advantage and to increase the rate of opening and closing movement of the pads.

Figure 4:
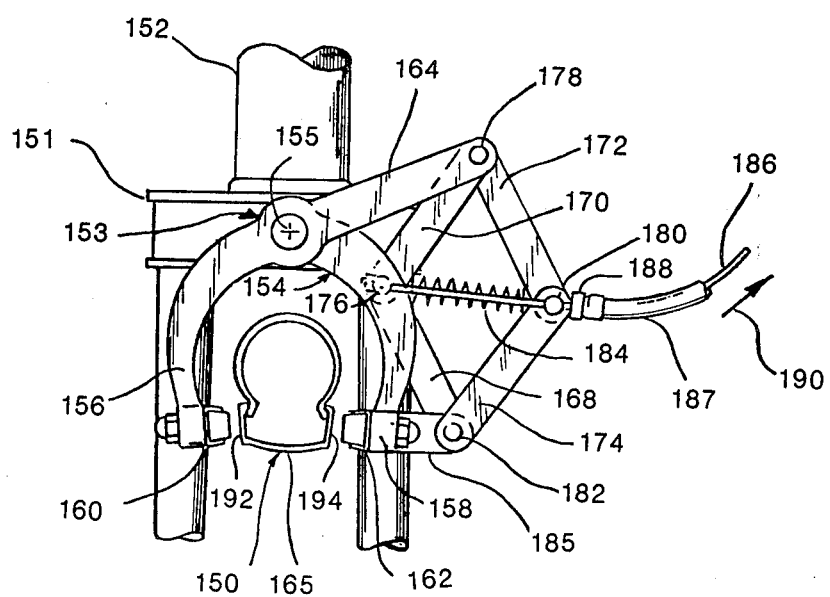

Brake Operating Means of FIG. 4

Referring now to FIG. 4, another form of brake operating means is illustratively shown in association with a front wheel assembly 150 rotatably supported by a fork assembly 151 mounted in a fork housing 152 attached to the frame of a bicycle. The operating means comprises a pair of arm members 153, 154 which are pivotally connected by pivot means 155 attached to fork 151 for movement between the non-braking and braking positions. Each arm member has inner (lower) arm portions 156, 158 on which brake pad means 160, 162 are suitably mounted. Arm member 153 comprises an elongated outer (upper) arm portion 164 extending laterally outwardly from pivot 155 on the same side as arm member 154 a substantial distance beyond and generally transversely to the plane of movement of the moving wheel rim member 165.

The operating means further comprises a multiple link parallelogram type linkage means in the form of four equal length linkage members 168, 170, 172, 174 which are connected by four pivot pin means 176, 178, 180, 182 for movement between an open non-braking position as shown in FIG. 4 and a closed braking position (not shown). A spring means 184, in the form of a compression spring member, is mounted between the linkage members to bias them to the non-braking position and arranged to exert an opening force proportional to applied braking force. The linkage members are pivotally connected by pivot pin means 178, 182 to, respectively, the outer end portion 164 of link member 153 and a laterally extending flange portion 185 at the inner end portion of link member 154.

A conventional cable means comprising a wire member 186 and a housing member 187 connect the linkage means to a conventional hand operated force applying means. The end portion of the wire is operably connected to the linkage members at pivot 176 and may extend through spring means 184 and pivot 180 for movement relative thereto. The end portion 188 of cable housing 187 is abuttingly engaged with link members 172, 174 at pivot 180 and an intermediate portion is fixed relative to the frame means in a conventional manner (not shown) at an intermediate position located a sufficient distance from pivot 180 to provide enough slack to permit movement with the pivot point.

In operation, braking force is applied to the wire member 186 in the direction of the arrow 190 and by the wire member to the link members 168, 170 at pivot 180 to cause closing pivotal movement of link members 168, 170 about pivots 178, 182. At the same time, the end of portion 188 of cable housing 187 applies an equal and opposite reactive force to link members 172, 174 at pivot 180 to cause equal pivotal closing movement of link members 172, 174 about pivots 178, 182. At the same time, the linkage applies increased force to arm members 153, 154 through pivots 178, 182 causing equal closing movement of the inner arm portions 156, 158 and pad means 160, 162.

In a presently preferred embodiment, the link members are constructed, connected and arranged so as to provide a mechanical advantage of 3:1. Thus, an average 150 pound force applied by the wire member 186 results in equal opposite 150 pound forces on pivots 176, 180. The 3:1 mechanical advantage of the linkage results in an output force on pivots 178, 182 and arm members 153, 154 of 450 pounds. The length of the arm members 153, 154 and the points of application of the input force from linkage members 168, 170, 172, 174 are arranged so as to provide a uniform mechanical advantage of, for example, 1:1.4 which is generally the same as in conventional bicycle caliper brake systems. The resultant relatively high applied force on each pad is 630 pounds which, with lubricated Oilite pad material having a coefficient of friction of 0.17, is more than sufficient to meet all current bicycle brake safety test requirements. As an approximate minimum requirement, a mechanical advantage of at least approximately 2:1 should be provided by linkage members 168, 170, 172, 174 which results in a minimum pad force of at least approximately 420 pounds per pad. It is further contemplated that the mechanical advantage provided by the pad arm members 153, 154 may be varied as necessary or desireable by employing various designs and arrangements of pad arms with the construction and design of the intermediate mechanical advantage means being modified as necessary to compensate for changes in the mechanical advantage of the pad arms. Again, as with the apparatus of FIG. 3, the brake pads may be spaced further outwardly from the side surfaces 192, 194 of the wheel rim than with conventional bicycle brake operating apparatus since the operating linkage causes faster longer initial movement of the brake pads from the non-braking position toward the braking position with slower shorter movement thereof at the braking position. When the force applied by the wire 186 is decreased and/or removed, the spring means 184 is immediately effective to quickly positively release the brake pads and cause movement to the non-braking position.

Figure 5:
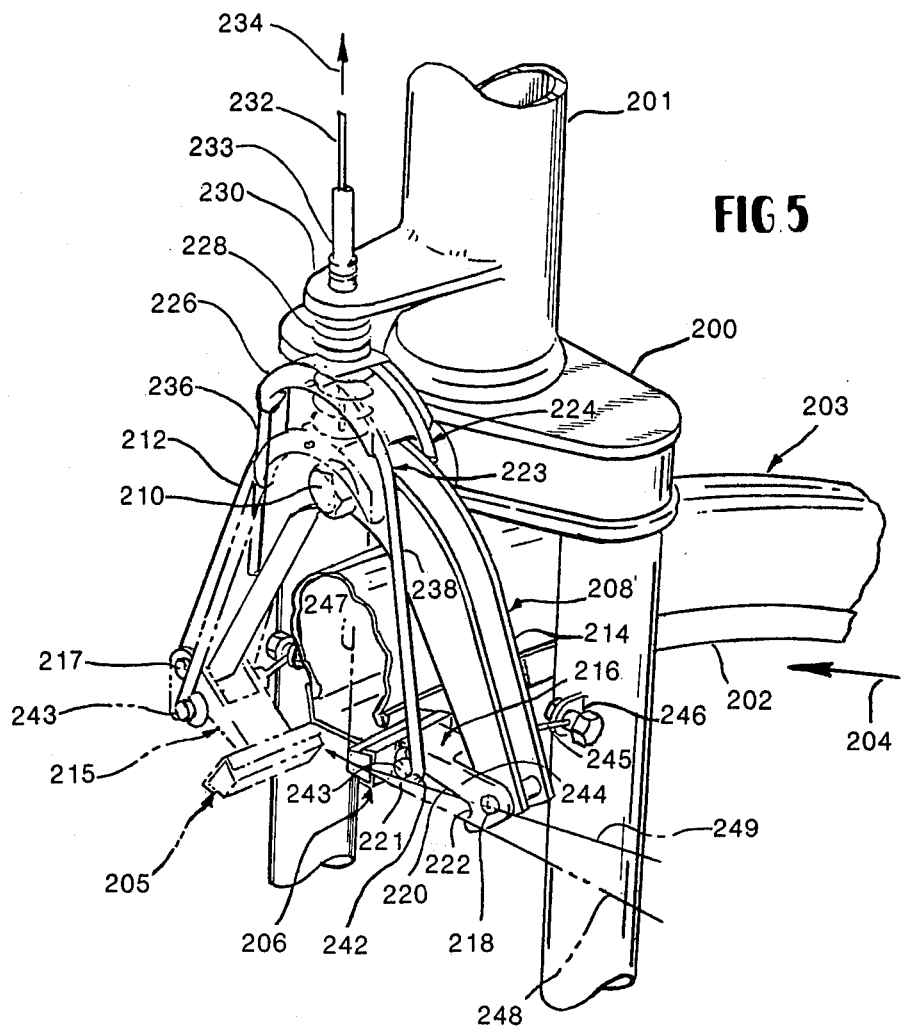

Brake Operating Means of FIG. 5

Referring now to FIG. 5, another form of brake operating means is shown mounted on the front wheel fork assembly 200 and fork housing portion 201 of a bicycle frame means 22 for applying braking force to the side surfaces of rim 202 of a front wheel assembly 203 to retard motion of the wheel in the direction of arrow 204 by application of force to brake pad means 205, 206 which are movable between a non-braking position, shown in broken lines with respect to pad 205, and a braking position illustrated by pad 206. The brake operating means comprises bracket means 208 fixedly connected to fork assembly 200 by suitable fastening means 210 and having a pair of oppositely downwardly outwardly extending rigid support arm portions 212, 214. A pair of pivotal brake pad support arm members 215, 216 are pivotally mounted on the lower ends of arm portions 212, 214 by pivotal connecting pin means 217, 218 for movement between the non-braking position of arm member 215 and the braking position of arm member 216. Each pad arm member 215, 216 comprises an elongated lower slide surface 220 extending generally radially relative to pivots 217, 218 between inner and outer radially spaced transverse abutment surfaces 221, 222.

The brake operating means further comprises a pair of formed resilient spring wire members 223, 224 mounted on a movable bracket member 226 supported for radial inward and outward reciprocable movement relative to wheel assembly 203 and relative to the frame means between non-braking (broken lines) and braking positions (solid lines). A spring means 228, in the form of a compression spring member, is associated with bracket member 226 to bias the bracket member, the spring wire members 223, 224, and the pad arm members 215, 216 toward the non-braking positions. In addition, the spring wire members also act as second spring means which bias the pad arm members toward the non-braking position. One end of spring member 228 abuts bracket member 226 and the other end abuts a flange member 230 fixed to the frame means 201. One end of a control wire member 232 of a flexible cable means 233 extends through flange member 230 and spring member 228, and is connected to bracket member 226 to apply operating force thereto in the direction of arrow 234 and the other end (not shown) is connected to force generating means such as a conventional hand operated lever type brake control means.

Each spring wire member 223, 224 is formed into U-shape configuration and comprises a pair of equal length arm portions 236, 238 connected by a curved connecting portion 240 fixed on a corresponding curved surface portion 241 of bracket member 226. The terminal end portions of arm portions 236, 238 are provided with loops 242 in which are secured a transverse rod member 243 extending transversely between the wire members 223, 224 with the peripheral surface thereof slidably engaging the slide surface 220 of the pad arm members to provide operative connecting means therebetween. Spring wire members 223, 224 are spaced from one another so that side surfaces of arm portions 238 slidably abutably engage the opposite side surfaces 244 of pad arm members 215, 216 for lateral stability. In order to provide further lateral stability and to enable reduction in weight and size of parts, particularly of bracket 208, support means in the form of a wire or rod 245 may be connected between a portion of the frame means 246, spaced rearwardly relative to the direction of movement 204 from the brake pads and the point of application of the braking forces, and a portion of the brake apparatus adjacent to the brake pads such as the rods 243.

In operation, when operating force is applied to bracket 226 through wire member 234, the bracket 226 is moved upwardly outwardly relative to the wheel assembly 204 against the bias of spring 228. The force is transferred through spring arm portions 236, 238 and slidable connecting rods 243 to slide surfaces 220 of pad arms 215, 216, to cause pivotal movement of both of the pad arms from the non-braking position of pad 205 toward the braking position of pad 206. The initial movement of the pad arms when slide rod 243 is closest to the pviotal axes 218 results in maximum displacement of the pads 205, 206 with minimum force application. As bracket 226 is moved further upwardly, the slide rods slide along surfaces 220 on the pad arms away from pivots 218 to increase the mechanical advantage while decreasing the amount of movement of the pads. As the bracket moves outwardly, the spring arm portions 236, 238 are placed in tension and move inwardly from the normal formed position to establish generally increasing spring forces biasing the pad arms toward the non-braking position. When the operating force is removed, the combination of the spring forces of spring member 228 and spring arm portions 236, 238 provide for very rapid positive return of the pad arms to the non-braking position. In addition, the arrangement is such that there is a gravity force assist during normal operation and, in the event that the apparatus fails, gravity will be effective to move the pad arms to a non-braking position. The pivots 218 are located in general transverse alignment with the side surface of the wheel rim and relatively closely adjacent but not at or below the plane of the line of braking force application to provide a wedging effect between the rim surface and the brake pad. In addition, the location of the pivots provides maximum clearance between the pad arms and the tire and rim of the bicycle to better accomodate wheel wobble and prevent malfunctioning. In addition, the apparatus provides the potential for using the inner bottom surface of the rim on opposite sides of the wheel spokes for braking.

An important feature of the apparatus of FIG. 5 involves the arrangement and location of pivotal axes 217, 218 relative to the plane 247 of engagement of the brake pad surfaces with the pad engaging surfaces of the moving member and the transverse line 248 of braking force application therebetween, and the arrangement and location of the brake pad surfaces relative to the pivotal axes 217, 218 and the pad engaging surfaces of the member which provides wedging means for increasing the applied braking force after engagement of the pad surfaces and the pad engaging surfaces of the moving member.

The arrangement is such that the radial distance between the pivotal axes 217, 218 and the pad surfaces is more than the radial distance between the pivotal axes and the pad engaging surfaces of the moving member. In addition, the pivotal axes are located closely adjacent and above the transverse line 248 of application of braking force between the pad surfaces and the surfaces of the moving member. The mechanical advantage provided is a function of the distance between the pivotal axes and the transverse line 248 of force application and increases as that distance is reduced. In order to prevent locking, the pivotal axes must be spaced some distance from the line of transverse force application and, in the presently preferred embodiment are spaced therefrom a distance such that a radial line 249 extending between the pivotal axes and the intersection of the transverse line 248 of force and the brake pad surfaces plane 247 intersects the transverse line of force 248 at an angle of between 7° and 10° which provides an increase in braking force sufficient to enable use of brake pad material of relatively low coefficient of friction of the type hereinbefore described. Once the pad surfaces are engaged with the surfaces of the moving member, the applied braking force is progressively increased as the arm members are further upwardly displaced by the force applied to the arm members through the wire spring members 223, 224 and connecting rod members 243.

Brake Operating Means of FIGS. 6–8

Referring now to FIGS. 6–8, another form of brake operating means, which includes the additional function of being self powering, i.e., the energy of the moving member is utilized to increase the applied braking force, is shown to be mounted on the front wheel fork assembly 250 mounted in a fork housing means 252 fixedly attached to a bicycle frame means 22 for operative association with a front wheel assembly 254 having a wheel rim 256 with spaced opposite side surfaces 257, 258. The apparatus comprises a pair of pad arm members 260, 262 which have pad members 264, 266 mounted on inner arm portions 268, 270 thereof. The arm members are pivotally connected by pivot means 272 for movement between non-braking and braking positions by application of equal and opposite force through cable means including a movable wire member 274 connected to an outer arm portion 276 of arm member 262 and a movable wire housing 278 connected to an outer arm portion 280 of arm member 260. The arrangement is such as to provide first force multiplying means of the type previously described which may have a mechanical advantage of 1.4 to 1.

The arms 260, 262 are mounted on additional self powering force multiplication means in the form of a pair of linkage members 281, 282 pivotally connected at one end by pivot means 284 fixedly mounted on bracket member 286 which is fixedly mounted relative to the frame means. The other ends of the links 281, 282 are pivotally connected, respectively, to the arm members 260, 262 by pivotal connecting means 288, 290. Spring means in the form of a torsion spring member 292 is associated with and biases the links 281, 282 toward an open outwardly displaced position of FIG. 6 while permitting movement to variably closed inwardly displaced positions (not shown). The arrangement is such that the pivot axis 272 is aligned with the central plane of movement of the moving member and extends generally parallel to the direction of movement at the area of application of braking force by the pads. In addition, the pivotal axes 284, 288, 290 extend parallel to the central plane of movement of the moving member and transversely to pivotal axis 272 with pivotal axis 284 being coplanar with pivotal axis 272 and the central plane of movement of the moving member. Furthermore, pivot 284 is located rearwardly of arms 260, 262 relative to the direction of movement of the moving member shown by arrow 293.

In operation, hand generated force is applied to arms 260, 262 through wire 274 and wire housing 278 to pivotally move the arms from the non-braking position to the braking position in a conventional manner. As soon as the brake pads engage the moving member a frictionally generated force is applied to the brake pads in the direction of movement of the moving member and that force is progressively increased in accordance with the applied braking force. The frictionally generated force causes movement of the brake pads, the arms 260, 262, and the pivotal connections 288, 290 in the direction of movement of the moving member which also causes the links 281, 282 to pivot inwardly toward the central plane of movement thereby applying additional braking force by causing further inward pivotal movement of arms 260, 262. Thus, the total braking force is continuously increased by the generated frictional force in proportion to the magnitude of the force applied to the wire 274. When the force on the wire 274 is removed, as by releasing the hand brake lever on a bicycle, the spring means 292 is immediately effective to rapidly and positively return the links 281, 282 to the original open position. The arrangement of links 281, 282 and pivots 288, 290 is such that the pivots 288, 290 travel along arcs having a center at pivot 284 so that the transverse component of movement of pivots 288, 290 gradually increases as the links are closed and gradually decreases as the links are returned to the open position whereby the spring means 292 is effective to enable rapid initial transverse displacement of pivots 288, 290 as soon as the wire applied force is removed.

Figure 9:
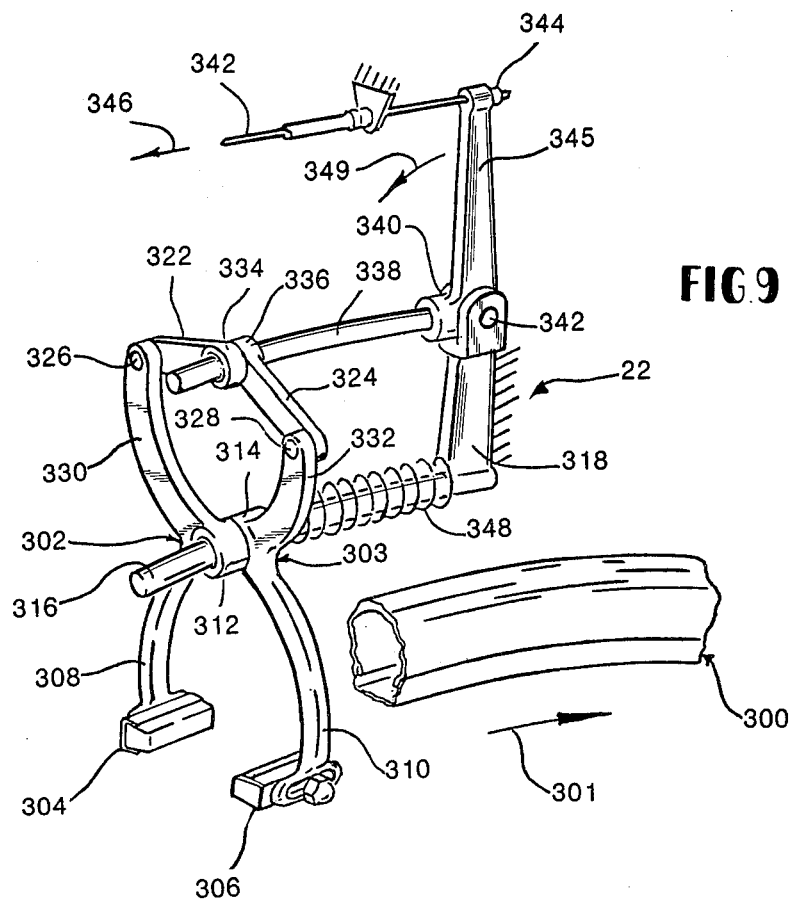

Brake Operating Means of FIG. 9

Referring now to FIG. 9, another form of brake operating means which is self powering is shown as mounted on bicycle frame means 22 in operative association with a bicycle wheel assembly 300 rotatable in the direction of arrow 301. The apparatus comprises a pair of pad arm members 302, 303 which have pad members 304, 306 mounted on inner arm portions 308, 310 thereof. The arm members are pivotally connected by pivot means in the form of bearing hub portions 312, 314 axially slidably pivotally mounted on support shaft means in the form of an elongated shaft member 316 which is fixedly connected at one end to a bracket member 318 fixed to the frame means and extends outwardly therefrom in rigid cantilever fashion in generally parallel relationship to the moving member 300. If the moving member is a wheel, the shaft member 316 has at least a slide portion which is curvilinear and extends along an arc having a common center with the moving member in uniformly radially outwardly spaced relationship thereto.

The force applying and multiplying means comprises a pair of linkage members 322, 324 pivotally connected at one end by pivotal connecting means 326, 328 to outer arm portions 330, 332 of the arm members 302, 303. The linkage members 322, 324 are pivotally connected by pivot means in the form of bearing hub portions 334, 336 axially slidably pivotally mounted on support shaft means in the form of a pivotally movable elongated shaft member 338 fixedly connected at one end to a lever member 340 pivotally mounted relative to the frame means by pivot means 342. The shaft member 338 extends outwardly from pivot means 342 in generally parallel relationship to the moving member 300 and the shaft member 316. If the moving member is a wheel, the shaft member 338 has at least a slide portion which is preferably of generally similar curvature so as to extend along an arc having approximately the same center of curvature as the moving member and the shaft member 316 and be located in uniformly radially outwardly spaced generally parallel relationship thereto at and during the position of engagement of the brake pads with the moving member. One end of a force applying wire member 342 is adjustably connected at 344 to the outer end of an arm portion 345 of lever member 340 and the other end (not shown) is connected to suitable force generating means such as a conventional bicycle hand brake lever (not shown) to apply braking forces in the direction of arrow 346. A spring means, in the form of a compression spring member 348 mounted on shaft member 316 between hub portion 314 and bracket member 318, is provided to bias the arm members 300, 302, 303 and the link members 322, 324 to the non-braking position of FIG. 10. The amount of force transferred from wire 342 to links 322, 324 depends on the radial distance between pivot 342 and the point of connection 344 of wire 342 to lever arm 345 and the radial distance between pivot 342 and the point of connection of links 322, 324 to shaft 338. These distances can be varied as necessary or desireable to increase or decrease the amount of force to be transferred thereby. The general curvature and relative positions of shafts 316, 338 may also be varied as necessary or desirable to enable proper operation of the linkage and proper positioning of the brake pads relative to the moving member. If necessary or desirable, a swivel type bearing connection may be provided at pivots 326, 332 between links 322, 324 and upper arm portions 330, 332 to enable free movement of the links 322, 324 and a split bearing arrangement may be used to connect links 322, 324 to shaft member 338 to equalize force transmission thereto.

In operation, the application of braking force on wire 342 in the direction of arrow 346 causes pivotal movement of lever member 345 and shaft member 338 in the direction of arrow 349 from the non-braking position to the braking position. The pivotal movement of shaft member 338 applies force on link members 322, 324 through the pivotal connecting means 334, 336. The initial force applied to link members 322, 324 is applied to the outer portions 320, 322 of arm members 302, 303 through pivots 326, 328 to pivotally displace the arm members relative to one another and move the brake pads 304, 306 into braking engagement with the moving member. The initial force applied to the link members is dependent upon a selected mechanical advantage determined by the radial distances between point 342 and the wire connection 344 and between the pivot 342 and the location of hub portions 334, 336 when the brake pads engage the moving member, and, thereafter, the arm members 302, 303 and link members 322, 324 are axially slidably displaced relative to shaft members 316 and 338 in the direction of movement of the moving member, as indicated by arrow 301, against the bias of spring member 348 to progressively decrease the distance between pivot 342 and hub portions 334, 336 and thereby progressively increase the mechanical advantage. The axial displacement occurs over a relatively short length of the shaft portions resulting in gradual increase of the amount of force applied to the brake pads through arms 302, 303. As soon as the wire applied force is removed, the arms 302, 303 move toward the non-braking position to disengage the pads and the compression spring 348 is effective to immediately positively return the hub portions to the initial axial positions.

The apparatus of FIG. 9 may be arranged to provide for self boosting of the applied braking force by varying the curvature of the portions of the shafts 316, 318 along which hub portions 312, 314 and 334, 336 are slidable. The curvatures of those portions of the shafts 316, 318 may be of such different curvature or inclination as to gradually reduce or increase the radial distance between hub portions 312, 314 and hub portions 334, 336 during sliding movement along the shafts 316, 318 resulting in gradual increase or decrease of the amount of force applied to the brake pads after the initial engagement between the brake pads and the moving member.

Brake System of FIG. 10

Referring now to FIG. 10, a brake system adapted to use brake pads of the type hereinbefore described in a continuously wet environment is illustrated as comprising a rotatable vehicular axle means 360 mounted in an axle housing means 362 and operatively associated in a conventional manner with conventional vehicular components (not shown); wheel mounting means attached to the axle means including a plate member 364 and lug bolts 366; brake housing means 368 including a rotatable annular housing member 370 attached to the axle means and an annular plate member 372 attached to the axle housing means; a conventional engine cooling radiator means 374 containing a fluid coolant and connected to the brake housing means by fluid circulating inlet and outlet lines 376, 378; sealing means 380 mounted between the housing member 370 and the plate member 372 including a conventional annular sealing ring member 382 and an annular support ring 384; and brake pad means 386, 388 mounted within the brake housing means in a conventional manner.

The brake pad means 386, 388 are movable between non-braking and braking positions relative to the brake housing means by conventional hydraulic force applying means 390, 392. The brake pad means are constructed of a material such as hereinbefore described which, when lubricated, provides the results hereinbefore described. The brake pads are immersed in the engine coolant within the brake housing means. The coolant serves as a lubricant and the brake pads are therefore continually lubricated and operated in a continuous wet environmental condition. It is contemplated that similar closed systems using other lubricants and liquids may be devised for most brake applications including automobiles, trucks, bicycles and the like.

It is intended that the following claims be construed to include alternative forms and embodiments of the aforedisclosed inventive concepts except insofar as limited by the prior art.

I claim:

1. A brake system for a bicycle or the like, having frame means for supporting a bicycle rider and rotatable wheel means for enabling movement of frame means and bicycle rider, and comprising:

brake pad means made from a substantially incompressible non-ferrous material having an effective coefficient of friction in both dry and wet operating conditions and having a friction surface engageable with the wheel means for generating a frictional braking force against the wheel means effective in both dry and wet operating conditions;

a pair of brake pad support arm means of equal effective length and being pivotally movably mounted relative to the frame means and the wheel means in juxtaposition to the wheel means for uniform equal length movement relative thereto and for supporting said brake pad means for uniform equal length movement between a non-braking position in maximum equally outwardly spaced relationship to the wheel means with each friction surface spaced equally outwardly of the wheel means and an inwardly displaced braking position with each friction surface in frictional engagement with the wheel means to apply braking force thereto;

hand operated braking force generating means mounted on the frame means and operably connected to said brake pad support arm means for operation of said brake pad support arm means and for generation of braking force by the bicycle rider;

force increasing means operatively associated with said brake pad support arm means and said brake pad means for uniformly equally increasing the brake force generated by the bicycle rider and for providing a relatively high uniform equal applied braking force on said brake pad means to generate sufficiently high effective braking force between said brake pad means and the rotatable wheel means in both dry and wet operating conditions;

said force increasing means comprising: linkage means and connecting means and operating means arranged and connected to said support arm means for causing relative rapid initial movement of said support arm means and said brake pad means a relatively large distance from said non-braking position toward said braking position at relatively low mechanical advantage, and for causing relatively slow final movement of said support arm means and said brake pad means a relatively short distance toward the braking position at relatively high mechanical advantage and to generate relatively high uniform equal applied braking force in the braking position; and said force increasing means comprising formed spring wire means being operably connected to said hand operated force generating means and being operatively associated with said brake pad support arm means for movement between a non-braking position by application of braking force generated by the bicycle rider and for causing movement of said brake pad support arm means between the non-braking position and the braking position.

2. The invention as defined in claim 1 and wherein said pad means having a viscous material means associated therewith for providing a viscous film between the friction surface and the wheel means in the braking position.

3. The invention as defined in claim 1 and wherein said pad means being made from a material which is substantially imcompressible by applied braking force.

4. The invention as defined in claim 1 and wherein said pad means being made of a sintered powder metallic material.

5. The invention as defined in claim 1 and wherein said pad means being made of a porous sintered powder metallic material.

6. The invention as defined in claim 1 and wherein said pad means being made of a material having a dry coefficient of friction less than approximately 0.4.

7. The invention as defined in claim 1 and wherein said pad means being made of a material having a wet coefficient of friction greater than approximately 0.10.

8. The invention as defined in claim 1 and wherein said pad means being made of a material having a dry coefficient of friction less than approximately 0.40 and a wet coefficient of friction greater than approximately 0.10.

9. The invention as defined in claim 1 and wherein said pad means being made of a material having a dry coefficient of friction of approximately 0.34 and a wet coefficient of friction of approximately 0.17.

10. The invention as defined in claim 1 and wherein said pad means being made of a porous relatively hard sintered powder metallic material which is substantially incompressible by applied braking forces and which has a relatively low dry coefficient of friction of less than approximately 0.40 and a relatively low wet coefficient of friction greater than approximately 0.10.

11. The invention as defined in claim 10 and wherein said pad means having a viscous material means associated therewith for providing a viscous film between the friction surface and the wheel means in the braking position.

12. Apparatus for applying a braking force to brake pad means of a braking system to retard the movement of a moving member by surface engagement with friction surfaces on the brake pad means and comprising:
brake pad support arm means of equal effective length for supporting the brake pad means and being mountable for uniform equal length movement relative to the moving member between a non-braking position with the friction surfaces equally spaced outwardly of the moving member and a braking position with the frictional surfaces in equal uniform frictional engagement with the moving member;
force applying means arranged and connected to said support arm means for causing relative rapid initial movement of said support arm means and the brake pad means a relatively large distance from said non-braking position toward said braking position at relatively low mechanical advantage, and for causing relatively slow final movement of said support arm means and the brake pad means a relatively short distance toward the braking position at relatively high mechanical advantage and to generate relatively high uniform equal applied braking force in the braking position; and
said force applying means comprising formed spring wire means being operatively associated with said brake pad support arm means for movement between a nonbraking position relative thereto and for causing movement of said brake pad support arm means between the non-braking position and the braking position.

13. The invention as defined in claim 12 and wherein: said brake pad means being made of a material having a substantially uniform relatively low coefficient of friction in both wet and dry operating conditions.

14. The invention as defined in claim 13 and wherein said brake pad means being made of a porous sintered powder metallic material which is substantially incompressible by applied braking force.

15. The invention as defined in claim 14 and wherein said brake pad means having a viscous material associated therewith for providing a viscous film between the friction surfaces and the moving member in the braking position.

16. The invention as defined in claims 1 or 12 and wherein said brake pad support arm means comprising:
pivotal axis means located outwardly of the moving member relatively closely adjacent the plane of engagement of the brake paid friction surfaces with the moving member and spaced therefrom a distance such that a radial line extending between the pivotal axis means and the point of intersection of the transverse line of force application and the brake pad surface plane intersects the transverse line of force application and the brake pad surface plane intersects the transverse line of force at an acute angle of approximately 10° or less whereby to provide a wedging action between the brake paid means and the moving member which increases the applied braking force.

17. The invention as defined in claim 16 and further comprising:
slide means connecting said formed spring wire means to said brake pad support arm means and being movable radially along said brake pad support arm means relative to said pivotal axis means between a radially innermost non-braking position relative to said pivotal axis means of minimum mechanical advantage and a radially outermost braking position relative to said pivotal axis means of maximum mechanical advantage for actuating said brake pad support arm means about said pivotal axis means between the non-braking position and the braking position.

18. The invention as defined in claims 1, 12, 13, 14, 15 or 17 and further comprising:
a common pivotal support means for pivotally supporting said brake pad support arm means; and
the distance from said common pivotal support means to the brake pad means being equal.

19. Apparatus for applying a braking force to brake pad means of a braking system to retard the movement of a moving member by surface engagement with friction surfaces on the brake pad means and comprising:
brake pad support arm means of equal effective length for supporting the brake pad means and being mountable for uniform equal length movement relative to the moving member between a non-braking position with the friction surfaces equally spaced outwardly of the moving member and a braking position with the frictional surfaces in equal uniform frictional engagement with the moving member;
force applying means arranged and connected to said support arm means for causing relative rapid initial movement of said support arm means and the brake pad means a relatively large distance from said non-braking position toward said braking position at relatively low mechanical advantage, and for causing relatively slow final movement of said support arm means and the brake pad means a relatively short distance toward the braking position at relatively high mechanical advantage and to generate relatively high uniform equal applied braking force in the braking position;

a common pivotal support means for pivotally supporting said brake pad support arm means; and the distance from said common pivotal support means to the brake pad means being equal.

20. The invention as defined in claim 19 and wherein: said brake pad means being made of a material having a substantially uniform relatively low coefficient of friction in both wet and dry operating conditions.

21. The invention as defined in claim 20 and wherein said brake pad means being made of a porous sintered powder metallic material which is substantially incompressible by applied braking force.

22. The invention as defined in claim 21 and wherein said brake pad means having a viscous material associated therewith for providing a viscous film between the friction surfaces and the moving member in the braking position.

23. The invention as defined in claim 19 and wherein said brake pad support arm means comprising:

pivotal axis means located outwardly of the moving member relatively closely adjacent the plane of engagement of the brake pad friction surfaces with the moving member and spaced therefrom a distance such that a radial line extending between the pivotal axis means and the point of intersection of the transverse line of force application and the brake pad surface plane intersects the transverse line of force at an acute angle of approximately 10° or less whereby to provide a wedging action between the brake pad means and the moving member which increases the applied braking force.

* * * * *